UNITED STATES PATENT OFFICE.

HUBERT CLAUS, OF THALE, GERMANY.

PROCESS OF ENAMELING SHEET-METAL ARTICLES.

SPECIFICATION forming part of Letters Patent No. 472,033, dated April 5, 1892.

Application filed November 13, 1891. Serial No. 411,796. (No specimens.)

*To all whom it may concern:*

Be it known that I, HUBERT CLAUS, a resident of Thale on the Harz, Germany, have invented an Improved Process of Enameling Sheet-Metal Articles, of which the following is a full, clear, and exact description.

This invention relates to a new process of ornamenting sheet-metal articles by an adhesive and protective coat of enamel; and it consists principally in sprinkling an enamel, prior to burning, with powdered bicarbonate of soda, thereby producing certain ornamental effects, as hereinafter more fully described.

In carrying my invention into effect I employ on the sheet metal a ground-glazing of the ordinary kind, preferring one which contains metallic oxides, and after firing I apply to this burned glazing another coat of enamel, which consists of feldspar, granite, sand, cryolite, borax, saltpeter, kaolin, and oxide of tin, all being carefully powdered, mingled into a uniform mass, and thoroughly melted together. I prefer to use in this mixture about forty-five parts, by weight, of feldspar, ten parts of granite, fourteen of sand, sixteen of cryolite, twenty of borax, two of saltpeter, three of kaolin, and three of oxide of tin; but these proportions may be suitably varied, according to the different effects to be produced. After the mass thus produced has been thoroughly ground in the presence of water and of clay until it can be spread out into a uniform adhesive, but thin, coating I add to twenty kilos of this mass about two hundred and fifty grams of sulphate of nickel and about fifty grams of sulphate of cobalt and mingle all the parts thoroughly together.

Instead of sulphate of nickel and sulphate of cobalt, I may use either of these ingredients or any analogous metallic salt. The mass thus obtained I now apply to the glazing on the metal article, and thereupon I sprinkle, by hand or suitable mechanism, upon the moist coating of the metal article calcined pulverized carbonate of soda (ammonia soda) and then dry and finally burn the article thus treated. The effect of the soda-sprinkling is to produce beautiful spots on the glazed enamel, appearing like pearl eyes of intense sparkle, which spots, in connection with the color of the enamel, produce a harmonious effect, the entire covering being at the same time durable, sufficiently elastic, and quite thin. It seems that the carbonate of soda, in connection with the metallic salts, produces insoluble carbonates, such as carbonate of nickel or carbonate of cobalt, ($NiCO_3$ or $CoCO_3$,) and these amorphous combinations seem to have the faculty of absorbing from their surroundings soluble sulphate of cobalt and of nickel either mechanically or to make basic salts: thus $2NiCO_3 + Ni(OH)_2$ or $2CoCO_3 + Co(OH)_2$. By this means the coloring principle of the surrounding mass is taken from the carbonates and collected in a central spot. At the same time, while this chemical action is taking place, a sulphate of soda is produced, ($CoSO_4 + CO_3Na_2 = CoCO_3 + Na_2SO_4$,) which sulphate of soda is anxious to absorb crystal water, and, withdrawing it from the enamel, causes currents and divisions in the enamel, producing a molecular movement, by means of which elevations and depressions are created similar to stalactical formations, which traverse in fine branches the entire surface of the enamel, producing beautiful lines and increasing, because of the presence of the metallic salts, the durability of the enameled coating, and being thus durable the coating can be of the greatest imaginable thinness and yet be a complete covering of the most durable character.

If desired, a transparent glazing, consisting of a mixture of feldspar, fluor-spar, quartz, borax, and saltpeter, may be applied over the enamel above mentioned to protect it from chemical reactions and interferences.

All metallic salts which form insoluble carbonates may be used in lieu of the sulphate of nickel or sulphate of cobalt—for example, salts of copper, chrome, iron, and manganese.

Having described my invention, what I claim is—

1. The process herein described of enameling sheet-metal articles, which process consists in applying to such articles an enamel containing a metallic salt or salts, and in sprinkling over said enamel, before firing and while it is moist, bicarbonate of soda, and then burning, substantially as described.

2. The process herein described of enameling sheet-metal articles, which process consists in applying to said articles an enamel containing sulphate of copper or of cobalt and in then sprinkling upon said enamel, before firing and while it is moist, carbonate of soda, and then burning, substantially as described.

3. The process herein described of enameling metallic articles, which process consists in first applying a glaze to said articles, in thereupon applying an enamel containing a metallic salt, and in thereupon, before firing and while said enamel is still moist, sprinkling it with bicarbonate of soda, and then burning, substantially as and for the purpose specified.

HUBERT CLAUS.

Witnesses:
W. EGGELING,
TH. BREHMSALTZ.